United States Patent
Govardhanam (10) Patent No.: US 11,897,514 B2
(45) Date of Patent: Feb. 13, 2024

(54) RIDE SHARE DROP OFF SELECTION

(71) Applicant: GM CRUISE HOLDINGS LLC, San Francisco, CA (US)

(72) Inventor: Hariprasad Govardhanam, Fremont, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 148 days.

(21) Appl. No.: 17/524,313

(22) Filed: Nov. 11, 2021

(65) Prior Publication Data
US 2023/0148391 A1   May 11, 2023

(51) Int. Cl.
*B60W 60/00* (2020.01)
*G06Q 10/0631* (2023.01)
*G06V 10/40* (2022.01)
*G06V 20/56* (2022.01)

(52) U.S. Cl.
CPC ... *B60W 60/00253* (2020.02); *G06Q 10/0631* (2013.01); *G06V 10/40* (2022.01); *G06V 20/56* (2022.01); *B60W 2554/406* (2020.02); *B60W 2554/4029* (2020.02); *B60W 2555/20* (2020.02)

(58) Field of Classification Search
CPC ... B60W 60/00253; B60W 2554/4029; B60W 2555/20; B60W 2554/406; G06V 10/40; G06V 20/56; G06Q 10/0631
See application file for complete search history.

(56) References Cited

U.S. PATENT DOCUMENTS

| | | | |
|---|---|---|---|
| 2018/0136656 A1* | 5/2018 | Rasmusson, Jr. .. | G01C 21/3638 |
| 2019/0094858 A1* | 3/2019 | Radosavljevic | G08G 1/14 |
| 2020/0207375 A1* | 7/2020 | Mehta | G06V 20/56 |
| 2020/0242583 A1* | 7/2020 | Sawyer | G06Q 30/0207 |
| 2020/0247431 A1* | 8/2020 | Ferencz | G01C 21/3658 |
| 2021/0192232 A1* | 6/2021 | Viswanathan | G06V 10/75 |
| 2021/0276591 A1* | 9/2021 | Urtasun | G06V 10/7715 |
| 2021/0350713 A1* | 11/2021 | Van Meeteren | B64C 39/022 |
| 2023/0169421 A1* | 6/2023 | Mehta | G06Q 10/06311 |
| | | | 705/7.13 |

* cited by examiner

*Primary Examiner* — Peter D Nolan
*Assistant Examiner* — Mikko Okechukwu Obioha
(74) *Attorney, Agent, or Firm* — Novak Druce Carroll LLP (57) ABSTRACT

The disclosed technology provides solutions for improving passenger drop-off functions implemented by an autonomous vehicle (AV). In some implementations, a process of the disclosed technology can include steps for collecting environmental data about an environment around an autonomous vehicle, wherein the environmental data comprises data pertaining to a roadway navigated by the autonomous vehicle, processing the environmental data to generate an area grid comprising a plurality of grid sections, and associating, based on the environmental data, one or more features with each of the plurality of grid sections. Systems and machine-readable media are also provided.

17 Claims, 5 Drawing Sheets

RIDE SHARE DROP OFF SELECTION

BACKGROUND

1. Technical Field

The disclosed technology provides solutions for passenger drop-off and in particular, for improving automated passenger drop-off functions performed by an autonomous vehicle (AV).

2. Introduction

Autonomous vehicles (AVs) are vehicles having computers and control systems that perform driving and navigation tasks that are conventionally performed by a human driver. As AV technologies continue to advance, they will be increasingly used to improve transportation efficiency and safety. As such, AVs will need to perform many of the functions that are conventionally performed by human drivers, such as performing navigation and routing tasks necessary to provide a safe and efficient transportation. Such tasks may require the collection and processing of large quantities of data using various sensor types, including but not limited to cameras and/or Light Detection and Ranging (LiDAR) sensors disposed on the AV. In some instances, the collected data can be used by the AV to perform tasks relating to passenger pick-up and drop-off.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

The passenger drop-off process can greatly affect overall customer experience with respect to ride-sharing services. In some instances, the drop-off location requested by the passenger may turn out to b non-ideal for passenger egress from the vehicle. For example, passengers may prefer to avoid exiting the vehicle onto or next to less desirable areas or objects, such as those with poor lighting, that are covered with rain (e.g., puddles) or snow (e.g., ice patches), and/or areas next to trash bins, fire hydrants, foliage (bushes/trees, etc.), and/or large crowds, etc.

Aspects of the disclosed technology provide solutions for identifying optimal passenger drop-off locations in order to improve overall passenger/user safety and satisfaction. In some aspects, the disclosed technology includes a process for parsing available roadway areas (into segments or cells) and identifying various features that are associated with each cell. Additionally, based on the associated features, various cells may be scored, thereby generating a quantitative indication of drop-off feasibility, e.g., a passenger drop-off feasibility score. Using these quantitative measures, the AV can better reason about where passenger drop-off can be conducted to best serve the interests of passenger safety, comfort, and convenience.

Figure 1:
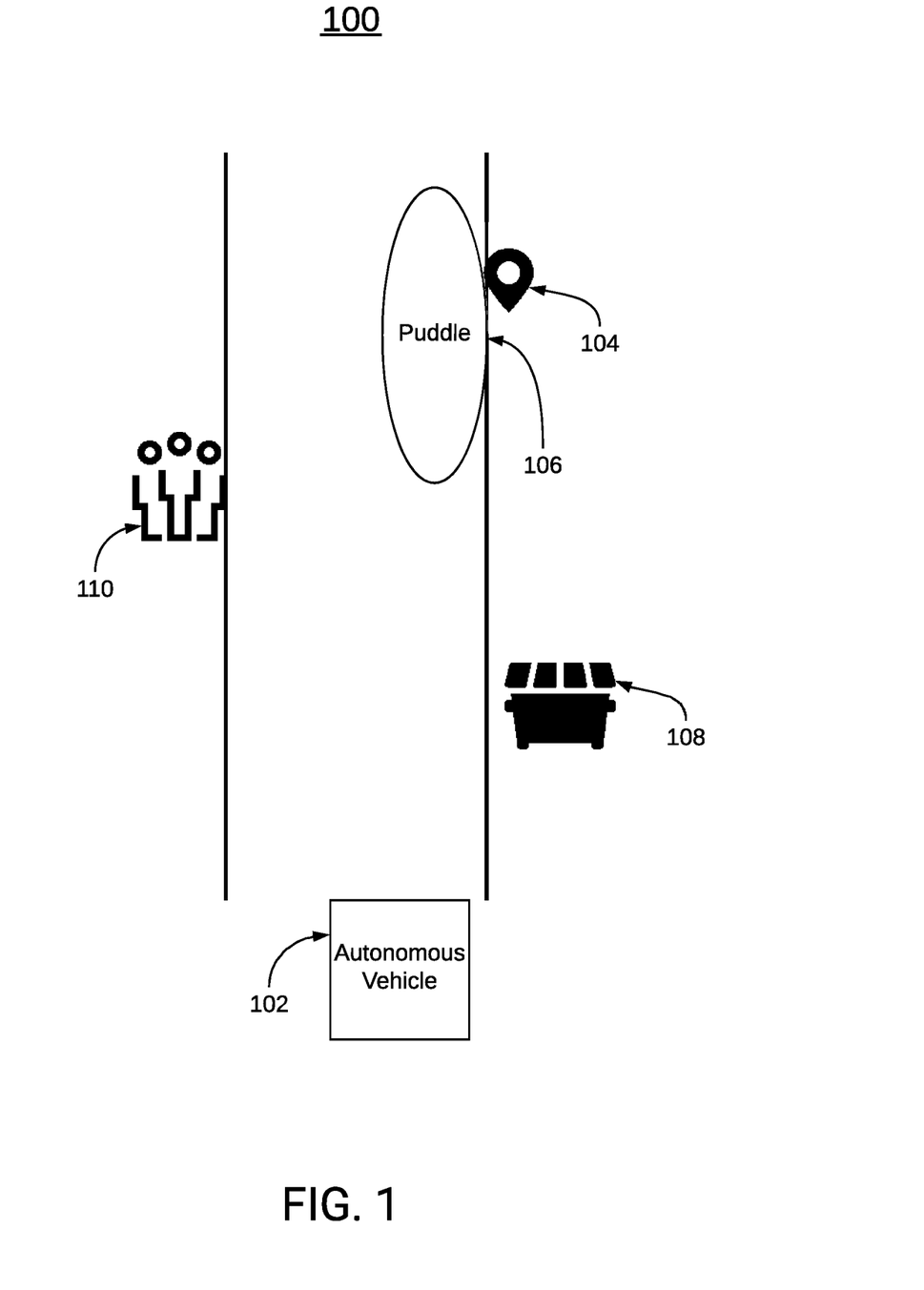
FIG. 1 conceptually illustrates an example environment in which a passenger drop-off process of the disclosed technology can be implemented.

FIG. 1 conceptually illustrates an example roadway environment 100 in which a passenger drop-off process of the disclosed technology can be implemented. In the illustrated example, an autonomous vehicle (AV) 102 carries a passenger en route to drop-off at a requested drop off location 104. However, various features along the roadway make corresponding drop-off locations potentially undesirable to the user. In the illustrated example, the requested drop-off location 104 is adjacent to a puddle 106. The roadway environment 100 includes other features that may make proximate drop-off areas undesirable to the user, including a trash bin (dumpster) 108, and a section that contains a large group or crowd of pedestrians 110. In some aspects the AV can analyze various regions of the roadway environment 100 to identify features/objects associated with each individual region (e.g., area or area cell), and to make passenger drop-off decisions based on an associated drop off feasibility score.

In some implementations, selection of a particular drop-off location can be based on a variety of factors, including but not limited to: proximity to the requested drop-off location 104, safety concerns, and/or passenger preferences. By way of example, the rider/passenger may indicate a preference for convenience over concern for being dropped-off near crowds. As such, the drop-off feasibility scoring may be higher (indicating greater passenger affinity) for areas closer to the requested drop-off location, but adjacent to pedestrian traffic, as opposed to areas that are farther from the requested drop-off location, but away from pedestrian traffic. By way of further example, passenger preferences may indicate a greater concern for safety, e.g., as opposed to convenience; as such, areas that have better lighting, or avoid poor roadway conditions (puddles, sleet, or snow, etc.), may result in a greater drop-off feasibility score, as opposed to closer drop-off locations that may be associated with features associated with a lower safety rating. Further details relating to a process for performing feature identification and scoring are discussed in further detail with respect to FIG. 2, below.

Figure 2:
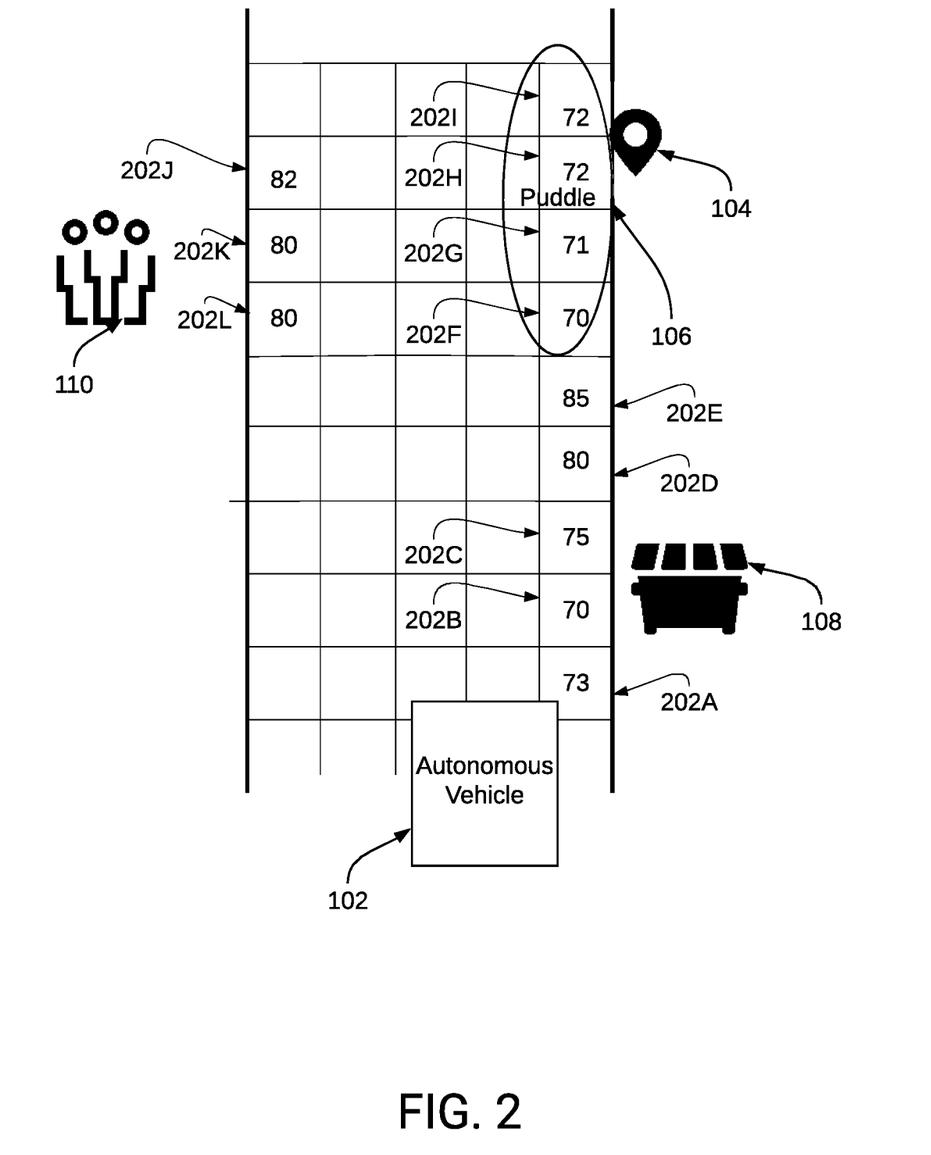
FIG. 2 illustrates an example of how a drop-off feasibility scoring process can be applied to the environment of FIG. 1, according to some aspects of the disclosed technology.

Specifically, FIG. 2 illustrates an example of how a drop-off feasibility scoring process can be applied to the example environment of FIG. 1, according to some aspects of the disclosed technology. In the illustrated example of FIG. 2, the roadway environment 100 is parsed into a number of roadway areas or cells. Mapping and parsing of the roadway environment 100 can be accomplished by collecting sensor data at the AV 102, for example, using one or more environmental sensors, including but not limited to one or more: Light Detection and Ranging (LiDAR) sensors, cameras, radar sensors, or the like. The collected environmental (sensor) data can then be projected into a top-down grid in which various portions of the roadway environment correspond with different cells within the grid. In the example of FIG. 2, the roadway environment 100 is parsed into a number grid sections or cells 202. For one or more of the cells, objects or characteristics can be identified (e.g., from the collected environmental data), and associated with one or more proximate cells. Based on the associations between cells and features proximate to the cell locations, one or more of the cells can be scored, e.g., to generate a quantitative measure of drop-off desirability, e.g., a drop-off feasibility score. In some aspects, the drop-off feasibility score may be based on an object count, for example, that quantifies a number of objects or features associated with a particular grid section. By way of example, greater preference (reflected in a higher/greater drop-off feasibility score) may be generally calculated or grid sections that have a relatively few number of associated objects of features, such as those that are free from puddles, and speed bumps, and that are not adjacent to high curbs or fire hydrants.

As indicated in the illustrated example, several of the cells 202 that are adjacent to various features in roadway environment 100 are associated with drop-off feasibility scores; for example, cells 202A-C are associated with scores 7, 70, and 75, respectively. In this example, the cell most proximate to dumpster 108 (e.g., cell 202B) is given a lower drop-off feasibility score than is cell 202A, which is farther from the requested drop-off location 104. This scoring differential may reflect a preference by the user/passenger 102 to avoid undesirable drop-off locations, even if the egress area is farther from the requested drop-off location. However, other/different feasibility scorings may be generated as a consequence of different user preferences.

Further to the example of FIG. 2, cell 202E has the highest drop-off feasibility score (e.g., 85), indicating that AV 102 has the highest confidence that this area/cell provides the optimal drop-off location for the passenger. For example, cell 202E provides an egress location relatively close to requested drop-off location 104, while avoiding puddle 106 that covers cells 202F-I, nearest drop-off location 104.

It is understood that the existence of other objects or conditions may affect a calculated drop-off feasibility score for the associated (or adjacent) road area. By way of example, objects such as speed breakers (speed bumps), fire hydrants, or pedestrian egress/ingress paths (e.g., store entrances), may result in lower drop-off feasibility scores. Additionally, other objects that may impede AV operations, such as door opening (e.g., high curbs, etc.), may also lead to lower drop-off feasibility scores.

Figure 3:
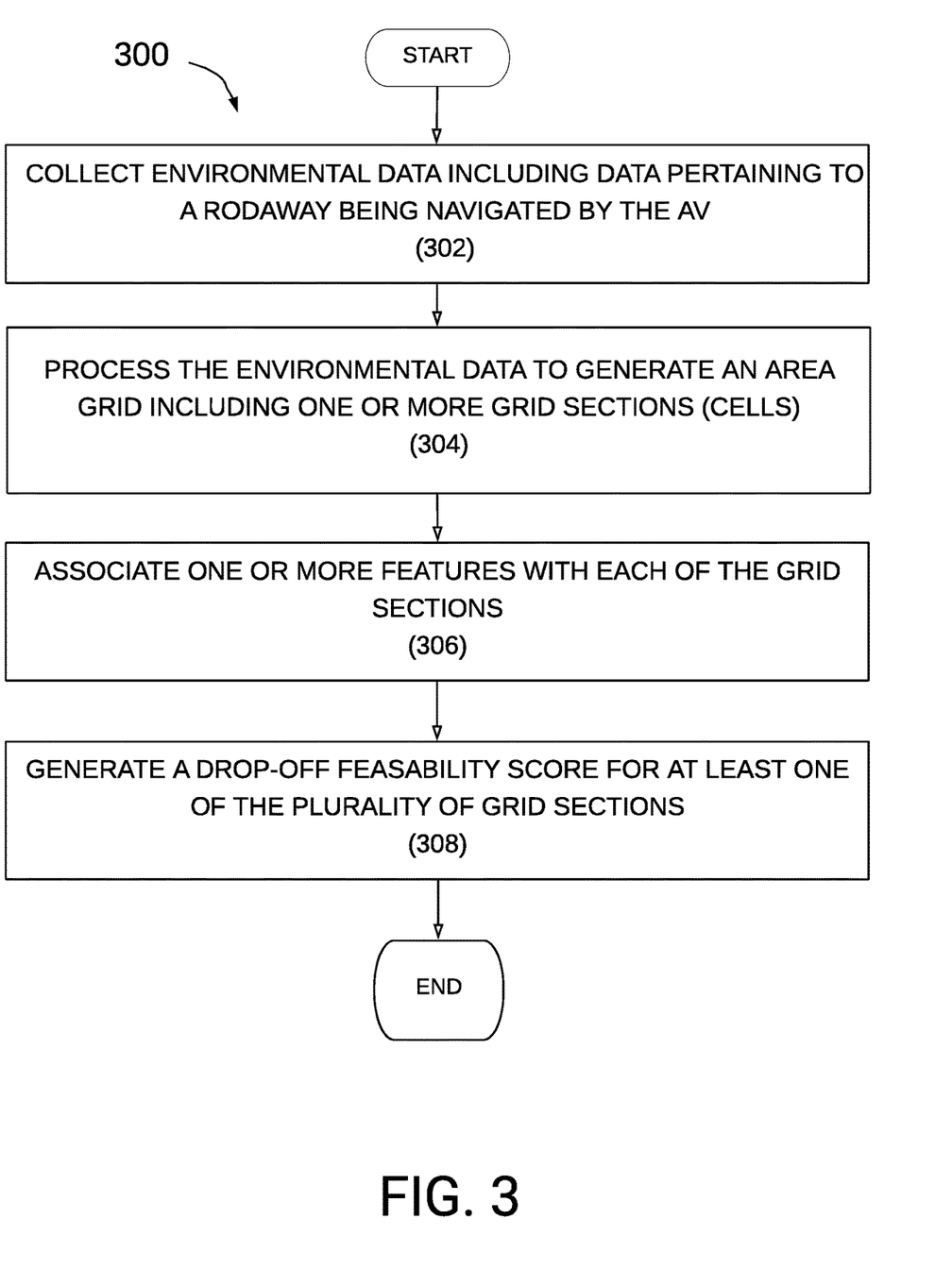
FIG. 3 illustrates an flow diagram of an example process for implementing drop-off feasibility scoring to improve passenger drop-off functions performed by an AV, according to some aspects of the disclosed technology.

FIG. 3 illustrates an example flow diagram of a process 300 for implementing drop-off feasibility scoring, according to some aspects of the disclosed technology. At step 302, the process 300 includes collecting environmental data including data pertaining to a roadway that is being navigated by an AV. As discussed above, environmental data, for example, regarding road conditions and objects in the surrounding environment can be collected using one or more sensors mounted to the AV (e.g., LiDAR, imaging, and/or radar sensors, etc.). In some aspects, environmental data may also be received by the AV, e.g., from a remote source or third-party source. By way of example, environmental data collected by other vehicles, such as other vehicles in the same fleet, may be provided to the collecting AV in order to provide contextual awareness about an area or map region in which passenger drop-off is to be conducted.

At step 304, the process 300 includes processing the environmental data to generate an area grid including one or more grid sections (cells). As illustrated with respect to FIG. 2, the area grid can be—or can include—a top-down projection of the map area surrounding or adjacent to the AV, i.e., that is based on the collected environmental data. As such, each region (cell) of the area grid can be associated with one or more objects, features, and/or characteristics, for example, based on whether the cell area contains (or is proximate to) a given object or feature. Further to the example of FIG. 2, cells 202A-202C can be associated with the dumpster 108, based on proximity; similarly, cells 202F-I can be associated with the puddle 106, e.g., due to the fact that the puddle 106 overlaps at least a portion of each corresponding cell. It is understood that cells may be associated with any type or number of objects, features, and/or characteristics, without departing from the scope of the disclosed technology.

At step 308, the process 300 can include generating a drop-off feasibility score for at least one of the grid sections (cells). Further to the examples discussed above with respect to FIG. 2, scores generated for any given cell can be based on a number of factors or constraints, including but not limited to: a proximity to the requested drop-off location, safety considerations, comfort considerations, and/or user preferences, etc. As such, drop-off decisions implemented by the AV can be made based on a quantitative comparison of drop-off feasibility scores for two or more cell areas. As discussed above, drop-off decisions made by the AV can also be informed by information associated with the passenger/user, such as user preference information. For example, some users/passengers/riders may have a greater preference for convenience, in which case area cells corresponding with (or proximate to) the user's indicated drop-off location may be given greater preference. In other instances, the passenger's preferences may indicate that they would prefer to prioritize safety over convenience, in which case, drop-off locations at a greater distance from the passenger's indicated drop-off location may be given greater preference. In some aspects, calculations of drop-off feasibility scores for one or more of the grid-cells (grid sections) may be based on user preference information.

Figure 4:
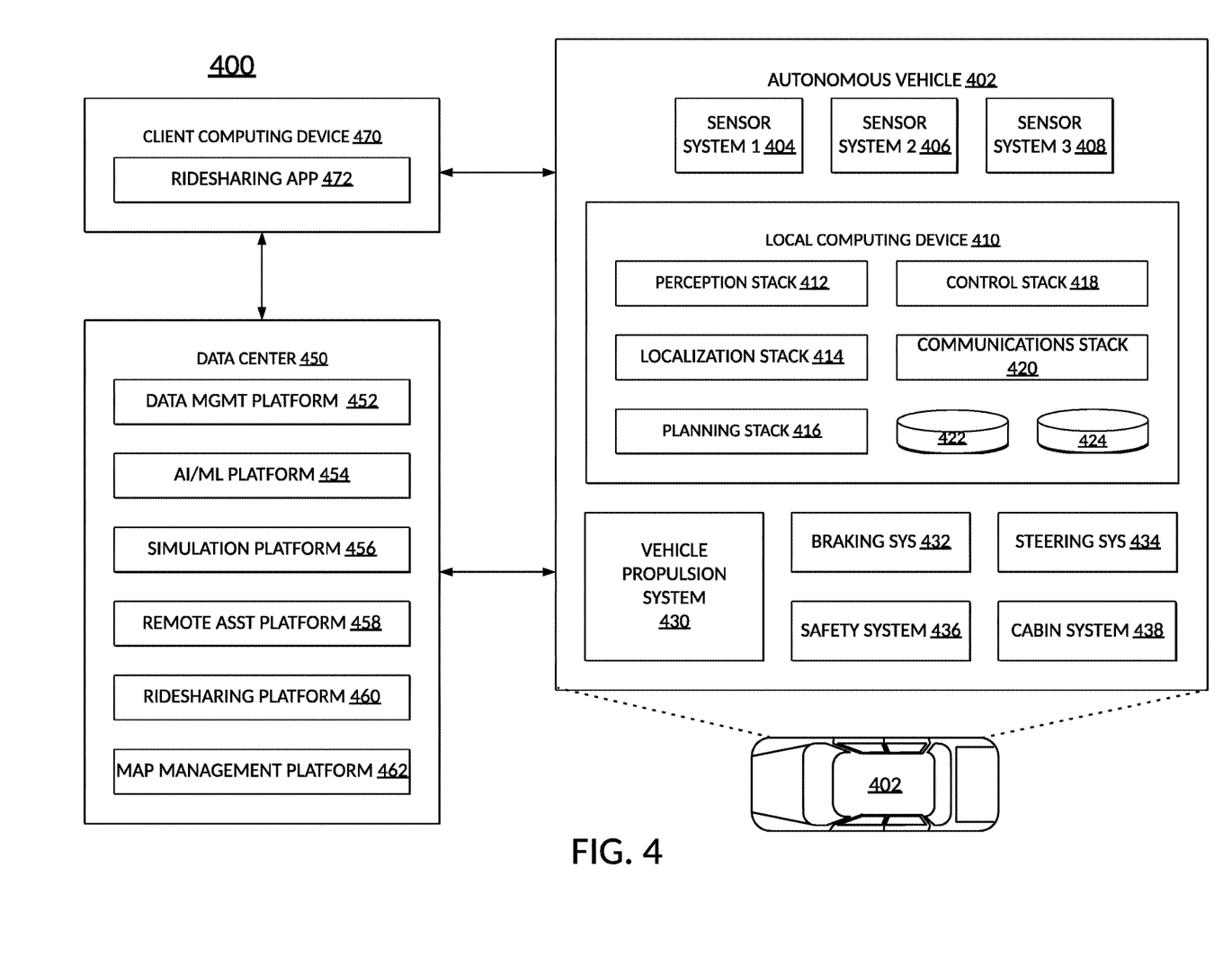
FIG. 4 illustrates an example system environment that can be used to facilitate AV dispatch and operations, according to some aspects of the disclosed technology.

Turning now to FIG. 4 illustrates an example of an AV management system 500. One of ordinary skill in the art will understand that, for the AV management system 400 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 400 includes an AV 402, a data center 450, and a client computing device 470. The AV 402, the data center 450, and the client computing device 470 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

AV 402 can navigate about roadways without a human driver based on sensor signals generated by multiple sensor systems 404, 406, and 408. The sensor systems 404-408 can include different types of sensors and can be arranged about the AV 402. For instance, the sensor systems 404-408 can comprise Inertial Measurement Units (IMUs), cameras (e.g., still image cameras, video cameras, etc.), light sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 404 can be a camera system, the sensor system 406 can be a LIDAR system, and the sensor system 408 can be a RADAR system. Other embodiments may include any other number and type of sensors.

AV 402 can also include several mechanical systems that can be used to maneuver or operate AV 402. For instance, the mechanical systems can include vehicle propulsion system 430, braking system 432, steering system 434, safety system 436, and cabin system 438, among other systems. Vehicle propulsion system 430 can include an electric motor, an internal combustion engine, or both. The braking system 432 can include an engine brake, brake pads, actuators, and/or any other suitable componentry configured to assist in decelerating AV 402. The steering system 434 can include suitable componentry configured to control the direction of movement of the AV 402 during navigation. Safety system 436 can include lights and signal indicators, a parking brake, airbags, and so forth. The cabin system 438 can include cabin temperature control systems, in-cabin entertainment systems, and so forth. In some embodiments, the AV 402 may not include human driver actuators (e.g., steering wheel, handbrake, foot brake pedal, foot accelerator pedal, turn signal lever, window wipers, etc.) for controlling the AV 402. Instead, the cabin system 438 can include one or more client interfaces, e.g., Graphical User Interfaces (GUIs), Voice User Interfaces (VUIs), etc., for controlling certain aspects of the mechanical systems 430-438.

AV 402 can additionally include a local computing device 410 that is in communication with the sensor systems 404-408, the mechanical systems 430-438, the data center 450, and the client computing device 470, among other systems. The local computing device 410 can include one or more processors and memory, including instructions that can be executed by the one or more processors. The instructions can make up one or more software stacks or components responsible for controlling the AV 402; communicating with the data center 450, the client computing device 470, and other systems; receiving inputs from riders, passengers, and other entities within the AV's environment; logging metrics collected by the sensor systems 404-408; and so forth. In this example, the local computing device 410 includes a perception stack 412, a mapping and localization stack 414, a planning stack 416, a control stack 418, a communications stack 420, an HD geospatial database 422, and an AV operational database 424, among other stacks and systems.

Perception stack 412 can enable the AV 402 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 404-408, the mapping and localization stack 414, the HD geospatial database 422, other components of the AV, and other data sources (e.g., the data center 450, the client computing device 470, third-party data sources, etc.). The perception stack 412 can detect and classify objects and determine their current and predicted locations, speeds, directions, and the like. In addition, the perception stack 412 can determine the free space around the AV 402 (e.g., to maintain a safe distance from other objects, change lanes, park the AV, etc.). The perception stack 412 can also identify environmental uncertainties, such as where to look for moving objects, flag areas that may be obscured or blocked from view, and so forth.

Mapping and localization stack 414 can determine the AV's position and orientation (pose) using different methods from multiple systems (e.g., GPS, IMUs, cameras, LIDAR, RADAR, ultrasonic sensors, the HD geospatial database 422, etc.). For example, in some embodiments, the AV 402 can compare sensor data captured in real-time by the sensor systems 404-408 to data in the HD geospatial database 422 to determine its precise (e.g., accurate to the order of a few centimeters or less) position and orientation. The AV 402 can focus its search based on sensor data from one or more first sensor systems (e.g., GPS) by matching sensor data from one or more second sensor systems (e.g., LIDAR). If the mapping and localization information from one system is unavailable, the AV 402 can use mapping and localization information from a redundant system and/or from remote data sources.

The planning stack 416 can determine how to maneuver or operate the AV 402 safely and efficiently in its environment. For example, the planning stack 416 can receive the location, speed, and direction of the AV 402, geospatial data, data regarding objects sharing the road with the AV 402 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 402 from one point to another. The planning stack 416 can determine multiple sets of one or more mechanical operations that the AV 402 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 416 can select from multiple backup plans to carry out. For example, while preparing to change lanes to turn right at an intersection, another vehicle may aggressively cut into the destination lane, making the lane change unsafe. The planning stack 416 could have already determined an alternative plan for such an event, and upon its occurrence, help to direct the AV 402 to go around the block instead of blocking a current lane while waiting for an opening to change lanes.

The control stack 418 can manage the operation of the vehicle propulsion system 430, the braking system 432, the steering system 434, the safety system 436, and the cabin system 438. The control stack 418 can receive sensor signals from the sensor systems 404-408 as well as communicate with other stacks or components of the local computing device 410 or a remote system (e.g., the data center 450) to effectuate operation of the AV 402. For example, the control stack 418 can implement the final path or actions from the multiple paths or actions provided by the planning stack 416. This can involve turning the routes and decisions from the planning stack 416 into commands for the actuators that control the AV's steering, throttle, brake, and drive unit.

The communication stack 420 can transmit and receive signals between the various stacks and other components of the AV 402 and between the AV 402, the data center 450, the client computing device 470, and other remote systems. The communication stack 420 can enable the local computing device 410 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 420 can also facilitate local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 422 can store HD maps and related data of the streets upon which the AV 402 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal U-turn lanes; permissive or protected only right turn lanes; etc.). The traffic controls lane can include geospatial information of traffic signal lights, traffic signs, and other road objects and related attributes.

The AV operational database 424 can store raw AV data generated by the sensor systems 404-408 and other components of the AV 402 and/or data received by the AV 402 from remote systems (e.g., the data center 450, the client computing device 470, etc.). In some embodiments, the raw AV data can include HD LIDAR point cloud data, image data, RADAR data, GPS data, and other sensor data that the data center 450 can use for creating or updating AV geospatial data as discussed further below with respect to FIG. 2 and elsewhere in the present disclosure.

The data center 450 can be a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and so forth. The data center 450 can include one or more computing devices remote to the local computing device 410 for managing a fleet of AVs and AV-related services. For example, in addition to managing the AV 402, the data center 450 may also support a ridesharing service, a delivery service, a remote/roadside assistance service, street services (e.g., street mapping, street patrol, street cleaning, street metering, parking reservation, etc.), and the like.

The data center 450 can send and receive various signals to and from the AV 402 and client computing device 470. These signals can include sensor data captured by the sensor systems 404-408, roadside assistance requests, software updates, ridesharing pick-up and drop-off instructions, and so forth. In this example, the data center 450 includes a data management platform 452, an Artificial Intelligence/Machine Learning (AI/ML) platform 454, a simulation platform 456, a remote assistance platform 458, a ridesharing platform 460, and map management system platform 462, among other systems.

Data management platform 452 can be a "big data" system capable of receiving and transmitting data at high velocities (e.g., near real-time or real-time), processing a large variety of data, and storing large volumes of data (e.g., terabytes, petabytes, or more of data). The varieties of data can include data having different structure (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 450 can access data stored by the data management platform 452 to provide their respective services.

The AI/ML platform 454 can provide the infrastructure for training and evaluating machine learning algorithms for operating the AV 402, the simulation platform 456, the remote assistance platform 458, the ridesharing platform 460, the map management system platform 462, and other platforms and systems. Using the AI/ML platform 454, data scientists can prepare data sets from the data management platform 452; select, design, and train machine learning models; evaluate, refine, and deploy the models; maintain, monitor, and retrain the models; and so on.

The simulation platform 456 can enable testing and validation of the algorithms, machine learning models, neural networks, and other development efforts for the AV 402, the remote assistance platform 458, the ridesharing platform 460, the map management system platform 462, and other platforms and systems. The simulation platform 456 can replicate a variety of driving environments and/or reproduce real-world scenarios from data captured by the AV 402, including rendering geospatial information and road infrastructure (e.g., streets, lanes, crosswalks, traffic lights, stop signs, etc.) obtained from the map management system platform 462; modeling the behavior of other vehicles, bicycles, pedestrians, and other dynamic elements; simulating inclement weather conditions, different traffic scenarios; and so on.

The remote assistance platform 458 can generate and transmit instructions regarding the operation of the AV 402. For example, in response to an output of the AI/ML platform 454 or other system of the data center 450, the remote assistance platform 458 can prepare instructions for one or more stacks or other components of the AV 402.

The ridesharing platform 460 can interact with a customer of a ridesharing service via a ridesharing application 472 executing on the client computing device 470. The client computing device 470 can be any type of computing system, including a server, desktop computer, laptop, tablet, smartphone, smart wearable device (e.g., smart watch, smart eyeglasses or other Head-Mounted Display (HMD), smart ear pods or other smart in-ear, on-ear, or over-ear device, etc.), gaming system, or other general purpose computing device for accessing the ridesharing application 472. The client computing device 470 can be a customer's mobile computing device or a computing device integrated with the AV 402 (e.g., the local computing device 410). The ridesharing platform 460 can receive requests to be picked up or dropped off from the ridesharing application 472 and dispatch the AV 402 for the trip.

Map management system platform 462 can provide a set of tools for the manipulation and management of geographic and spatial (geospatial) and related attribute data. The data management platform 452 can receive LIDAR point cloud data, image data (e.g., still image, video, etc.), RADAR data, GPS data, and other sensor data (e.g., raw data) from one or more AVs 402, UAVs, satellites, third-party mapping services, and other sources of geospatially referenced data. The raw data can be processed, and map management system platform 462 can render base representations (e.g., tiles (2D), bounding volumes (3D), etc.) of the AV geospatial data to enable users to view, query, label, edit, and otherwise interact with the data. Map management system platform 462 can manage workflows and tasks for operating on the AV geospatial data. Map management system platform 462 can control access to the AV geospatial data, including granting or limiting access to the AV geospatial data based on user-based, role-based, group-based, task-based, and other attribute-based access control mechanisms. Map management system platform 462 can provide version control for the AV geospatial data, such as to track specific changes that (human or machine) map editors have made to the data and to revert changes when necessary. Map management system platform 462 can administer release management of the AV geospatial data, including distributing suitable iterations of the data to different users, computing devices, AVs, and other consumers of HD maps. Map management system platform 462 can provide analytics regarding the AV geospatial data and related data, such as to generate insights relating to the throughput and quality of mapping tasks.

In some embodiments, the map viewing services of map management system platform 462 can be modularized and deployed as part of one or more of the platforms and systems of the data center 450. For example, the AI/ML platform 454 may incorporate the map viewing services for visualizing the effectiveness of various object detection or object classification models, the simulation platform 456 may incorporate the map viewing services for recreating and visualizing certain driving scenarios, the remote assistance platform 458 may incorporate the map viewing services for replaying traffic incidents to facilitate and coordinate aid, the ridesharing platform 460 may incorporate the map viewing services into the client application 472 to enable passengers to view the AV 402 in transit en route to a pick-up or drop-off location, and so on.

Figure 5:
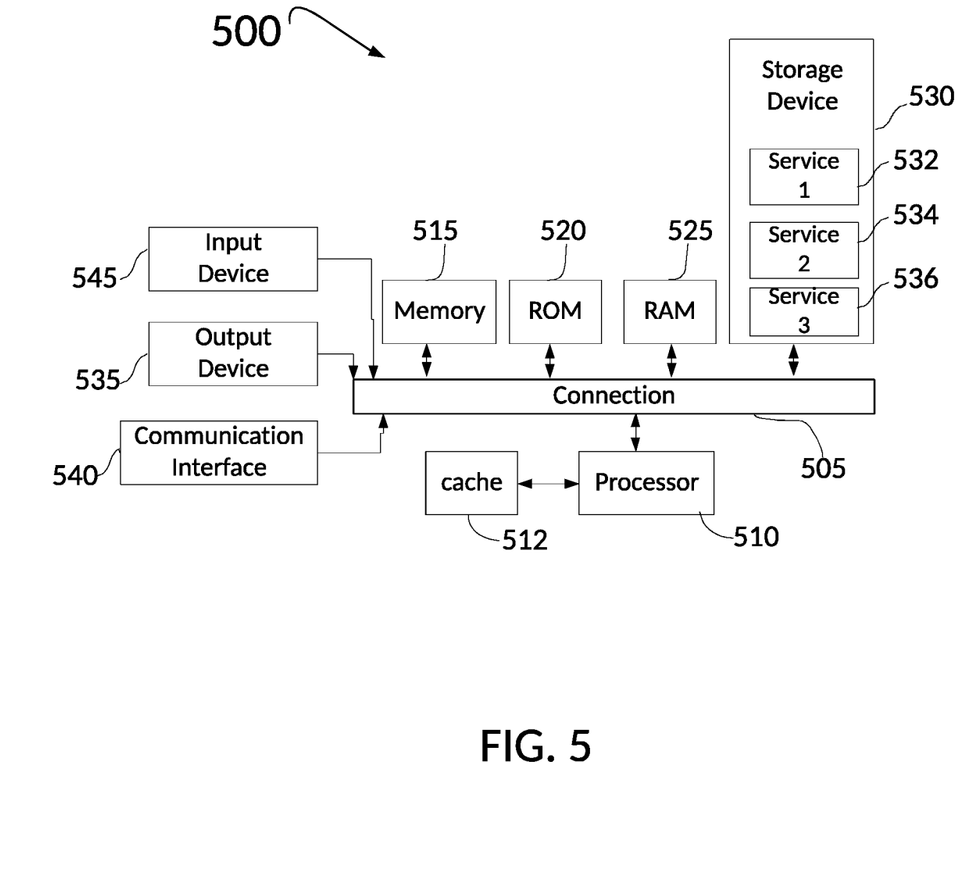
FIG. 5 illustrates an example processor-based system with which some aspects of the subject technology can be implemented.

FIG. 5 illustrates an example processor-based system with which some aspects of the subject technology can be implemented. For example, processor-based system 500 can be any computing device making up internal computing system 510, remote computing system 550, a passenger device executing the rideshare app 570, internal computing device 530, or any component thereof in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 500 includes at least one processing unit (CPU or processor) 510 and connection 505 that couples various system components including system memory 515, such as read-only memory (ROM) 520 and random-access memory (RAM) 525 to processor 510. Computing system 500 can include a cache of high-speed memory 512 connected directly with, in close proximity to, or integrated as part of processor 510.

Processor 510 can include any general-purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. The communication interface may perform or facilitate receipt and/or transmission wired or wireless communications via wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLU- ETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

Communication interface 540 may also include one or more Global Navigation Satellite System (GNSS) receivers or transceivers that are used to determine a location of the computing system 500 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 530 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

Storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

As understood by those of skill in the art, machine-learning based classification techniques can vary depending on the desired implementation. For example, machine-learning classification schemes can utilize one or more of the following, alone or in combination: hidden Markov models; recurrent neural networks; convolutional neural networks (CNNs); deep learning; Bayesian symbolic methods; general adversarial networks (GANs); support vector machines; image registration methods; applicable rule-based system. Where regression algorithms are used, they may include including but are not limited to: a Stochastic Gradient Descent Regressor, and/or a Passive Aggressive Regressor, etc.

Machine learning classification models can also be based on clustering algorithms (e.g., a Mini-batch K-means clustering algorithm), a recommendation algorithm (e.g., a Mini-wise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

What is claimed is:

1. An autonomous vehicle, comprising:
one or more environmental sensors;
at least one memory; and
at least one processor coupled to the at least one memory and the one or more environmental sensors, the at least one processor configured to:
   collect environmental data, via the environmental sensors, about an environment around the autonomous vehicle, wherein the environmental data comprises data pertaining to a roadway navigated by the autonomous vehicle;
   project the environmental data onto an area grid comprising a plurality of grid sections, and wherein each grid section corresponds with a different area of the roadway;
   associate, based on the environmental data, each of the plurality of grid sections with one or more features or objects; and
   generate a drop-off feasibility score for at least one of the plurality of grid sections based on the one or more features associated with each of the plurality of grid sections.

2. The autonomous vehicle of claim 1, wherein the at least one processor is further configured to:
determine an optimal drop-off location on the roadway for a passenger of the autonomous vehicle, based on the drop-off feasibility score for each of the plurality of grid sections.

3. The autonomous vehicle of claim 2, wherein determining the optimal drop-off location for the passenger is further based on a location requested by the passenger.

4. The autonomous vehicle of claim 2, wherein determining the optimal drop-off location is further based on preference information associated with the passenger.

5. The autonomous vehicle of claim 1, wherein the one or more features comprises: a lighting condition, an indication of adjacent structures, an indication of roadway conditions, or a combination thereof.

6. The autonomous vehicle of claim 1, wherein the one or more features comprises a number of objects associated with a grid section, a number of pedestrians associated with the grid section, or a combination thereof.

7. A computer-implemented method, comprising:
collecting environmental data, using one or more environmental sensors, about an environment around an autonomous vehicle, wherein the environmental data comprises data pertaining to a roadway navigated by the autonomous vehicle;
processing the environmental data onto an area grid comprising a plurality of grid sections, and wherein each grid section corresponds with a different area of the roadway;
associating, based on the environmental data, each of the plurality of grid sections with one or more features or objects; and
generating a drop-off feasibility score for at least one of the plurality of grid sections based on the one or more features associated with each of the plurality of grid sections.

8. The computer-implemented method of claim 7, further comprising:
determining an optimal drop-off location on the roadway for a passenger of the autonomous vehicle, based on the drop-off feasibility score for each of the plurality of grid sections.

9. The computer-implemented method of claim 8, wherein determining the optimal drop-off location for the passenger is further based on a location requested by the passenger.

10. The computer-implemented method of claim 8, wherein determining the optimal drop-off location is further based on preference information associated with the passenger.

11. The computer-implemented method of claim 7, wherein the one or more features comprises: a lighting condition, an indication of adjacent structures, an indication of roadway conditions, or a combination thereof.

12. The computer-implemented method of claim 7, wherein the one or more features comprises a number of objects associated with a grid section, a number of pedestrians associated with the grid section, or a combination thereof.

13. A non-transitory computer-readable storage medium comprising at least one instruction for causing a computer or processor to:
collect environmental data, using one or more environmental sensors, about an environment around an autonomous vehicle, wherein the environmental data comprises data pertaining to a roadway navigated by the autonomous vehicle;
project the environmental data onto an area grid comprising a plurality of grid sections, and wherein each grid section corresponds with a different area of the roadway;
associate, based on the environmental data, each of the plurality of grid sections with one or more features or objects; and
generate a drop-off feasibility score for at least one of the plurality of grid sections based on the one or more features associated with each of the plurality of grid sections.

14. The non-transitory computer-readable storage medium of claim 13, wherein the at least one instruction is further configured to cause the computer or processor to:
determine an optimal drop-off location on the roadway for a passenger of the autonomous vehicle, based on the drop-off feasibility score for each of the plurality of grid sections.

15. The non-transitory computer-readable storage medium of claim 14, wherein determining the optimal drop-off location for the passenger is further based on a location requested by the passenger.

16. The non-transitory computer-readable storage medium of claim 14, wherein determining the optimal drop-off location is further based on preference information associated with the passenger.

17. The non-transitory computer-readable storage medium of claim 13, wherein the one or more features comprises: a lighting condition, an indication of adjacent structures, an indication of roadway conditions, or a combination thereof.

* * * * *